(12) United States Patent
Shurina et al.

(10) Patent No.: US 9,057,450 B2
(45) Date of Patent: Jun. 16, 2015

(54) VALVE EXERCISER FOR AN EMERGENCY SHUTOFF VALVE OF A STEAM TURBINE AND METHOD FOR USING THE SAME

(71) Applicant: Elliott Company, Jeannette, PA (US)

(72) Inventors: James Shurina, Lower Burrell, PA (US); Robert J. Gilmore, Jeannette, PA (US); Michael Arthen Mindock, III, New Ringgold, PA (US)

(73) Assignee: Elliott Company, Jeannette, PA (US)

( * ) Notice: Subject to any disclaimer, the term of this patent is extended or adjusted under 35 U.S.C. 154(b) by 133 days.

(21) Appl. No.: 13/799,896

(22) Filed: Mar. 13, 2013

(65) Prior Publication Data

US 2014/0261726 A1   Sep. 18, 2014

(51) Int. Cl.
*F16K 29/00* (2006.01)
*F01D 17/14* (2006.01)
*F16K 31/56* (2006.01)

(52) U.S. Cl.
CPC ............... *F16K 29/00* (2013.01); *F01D 17/145* (2013.01); *F16K 31/56* (2013.01)

(58) Field of Classification Search
CPC ........ F01D 17/145; F16K 31/56; F16K 1/443
USPC ................ 251/73–75, 284, 285, 288, 89, 90; 137/315.27, 495, 455–463
See application file for complete search history.

(56) References Cited

U.S. PATENT DOCUMENTS

| | | | | |
|---|---|---|---|---|
| 2,571,707 A | * | 10/1951 | Manious | 251/44 |
| 3,150,687 A | * | 9/1964 | Torsten | 137/625.4 |
| 4,696,452 A | * | 9/1987 | Miyagawa et al. | 251/25 |
| 6,082,393 A | | 7/2000 | Tye | |

OTHER PUBLICATIONS

Compressor & Turbine Services LLC, Houston, TX, TnT Exercisor, Jul. 4, 2000.
Dresser-Rand, Trip & Throttle Valve With Exercisers, Jan. 1, 2000.

* cited by examiner

*Primary Examiner* — Marina Tietjen
(74) *Attorney, Agent, or Firm* — The Webb Law Firm

(57) ABSTRACT

An apparatus for exercising an emergency shutoff valve of a steam turbine and methods for operating the same are disclosed herein. A cover of the valve exerciser mounts on top of an emergency shutoff valve body and through a stroker bolt threadingly engaged with the shutoff valve lever arm, the valve stem is moved within a passageway of the cover a small amount so that the aperture between the steam inlet and outlet is not blocked, thereby permitting normal operation of the steam valve while the valve stem is exercised.

20 Claims, 6 Drawing Sheets

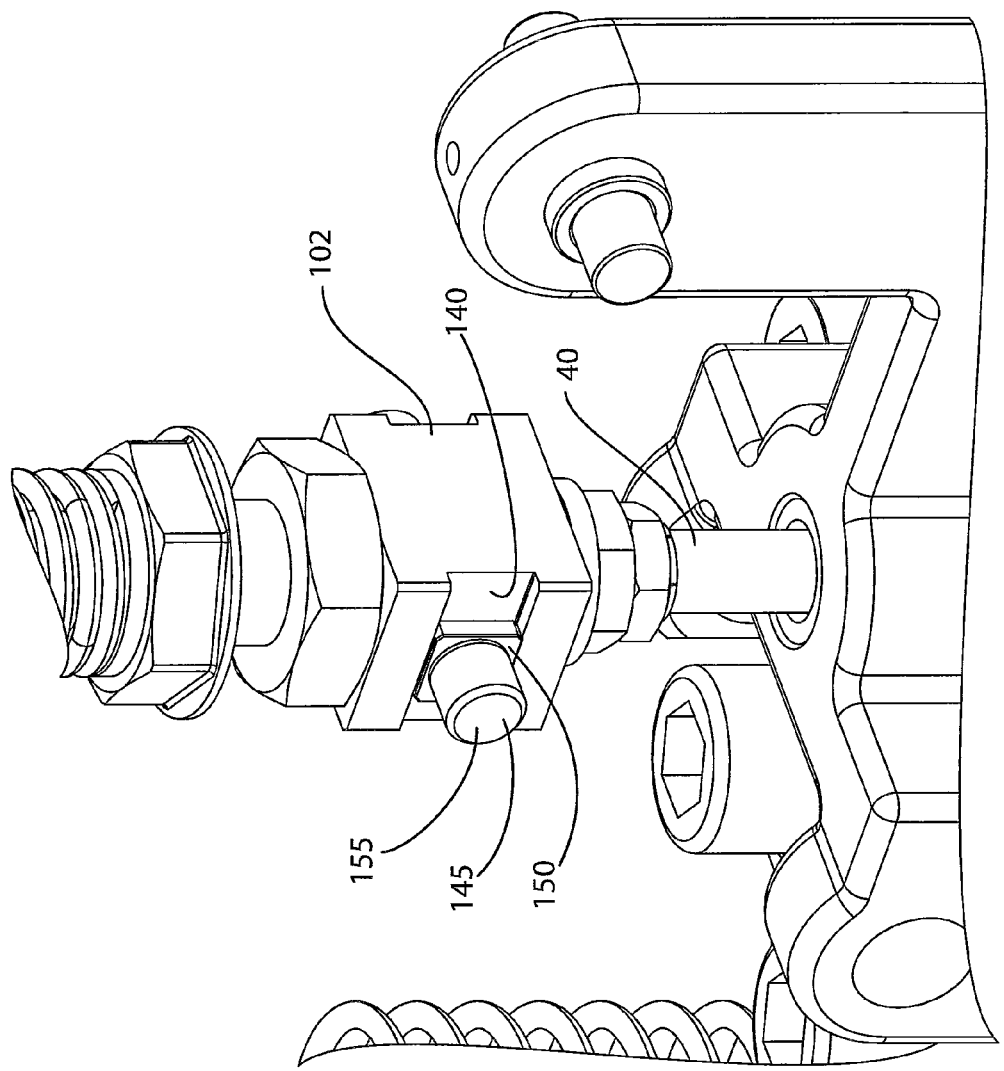

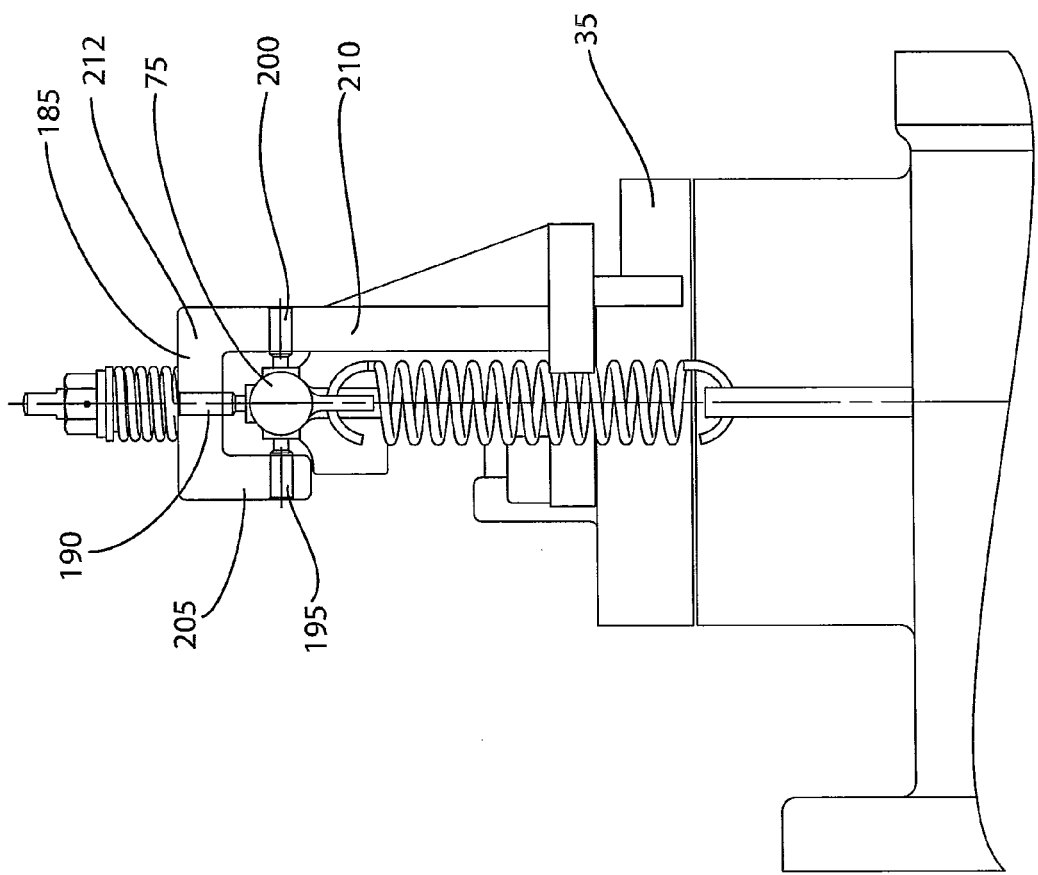

VALVE EXERCISER FOR AN EMERGENCY SHUTOFF VALVE OF A STEAM TURBINE AND METHOD FOR USING THE SAME

BACKGROUND OF THE INVENTION

1. Field of the Invention

The present invention relates to an exerciser for an emergency shutoff valve used with steam turbines.

2. Description of the Related Art

An emergency shutoff valve, or trip valve, is used on steam turbines to quickly shutoff the flow of steam, thereby shutting down the turbine. Different turbine conditions may trip the shutoff valve such as an over speed condition of the turbine or, in some cases, the existence of a low oil pressure condition.

Since an emergency shutoff condition occurs only rarely, the shutoff valve for most of its life is in the open position, whereby steam can freely travel between the inlet through an aperture and to the outlet. However, as a result of the valve remaining in the same position for a long period of time, deposits build up on the bushings surrounding the valve stem. It is imperative during a trip condition that the valve stem is free to move so that the valve closes without delay. The only certain way to check the integrity of the valve is to occasionally move the valve stem back and forth, otherwise known as exercising the valve, within the valve body so that deposits around the bushings are broken up and do not slow or bind the valve from closing. It is only necessary to reciprocate the valve stem within a small range, for example 0.25 inches, to exercise the valve.

A valve exerciser consists of a number of components that are assembled on the existing emergency shutoff valve and provide a means for an operator to move the valve stem with the valve plug in a controlled manner.

In the past, in order to exercise a valve, it was necessary for the operator to shutoff the flow of steam to the turbine and, at that time, reciprocate the valve stem within the valve body to break any deposits that may have built up. Taking a steam turbine off-line is a very costly and time consuming event and, for that reason, is done only when absolutely necessary.

It is an object of the subject invention to provide a device and a method of exercising the emergency shutoff valve while maintaining the shutoff valve in an operational condition such that the associated steam turbine may continue to operate while the valve is being exercised.

SUMMARY OF THE INVENTION

One embodiment of the present invention is directed to a valve exerciser for a valve stem of an emergency shutoff valve of a steam turbine wherein the valve may be exercised while the turbine is operating. The valve has a steam inlet, a steam outlet, and an aperture therebetween. The exerciser comprises:

a) a cover connected to a shutoff valve body for supporting components of the exerciser;

b) a valve stem extending through a passageway within the cover into the cavity of the valve body for enabling vertical reciprocal movement of the valve stem, wherein the bottom of the valve stem has a valve plug with the first side adapted to seal the aperture for emergency shutoff in a shutoff position and a second side adapted to rest against the cover to provide a seal between the passageway and the valve cavity in a normal operating position;

c) a lever arm pivotally attached to the cover and biased to contact and move the valve stem and plug into the shutoff position, and wherein, in the normal operating position, the lever arm is held stationary by a trip arm and in a shutoff position, the lever arm is tripped and the valve plug seals the aperture;

d) a bottom ring engaged with the valve stem below the lever arm against which the lever arm moves to close the valve;

e) a compression spring located and compressed between the top of the valve stem and the lever arm to urge the valve stem and the plug upwardly so the second side of the plug maintains a seal between the passageway and the cavity; and f) a stroker bolt threadingly engaged with the lever arm, wherein the stroker bolt may be rotated and advanced to engage the bottom ring and move the valve stem downwardly to exercise the valve without tripping the valve.

Another embodiment of the present invention is directed to a method of exercising a valve stem of an emergency shutoff valve of a steam turbine while the turbine is operating, and wherein the valve has a body with a steam inlet, a steam outlet and an aperture therebetween. The valve body has a cover connected thereto for supporting components used for exercising the valve stem. A valve stem extends through a passageway within the cover into the cavity of the valve body for enabling vertical reciprocal movement of the valve stem; wherein the bottom of the valve stem has a double sided plug with the first side adapted to seal the aperture for emergency shutoff in a shutoff position and a second side adapted to rest against the cover to provide a seal between the passageway and the valve cavity in an operating position. A lever arm is pivotally attached to the cover and biased to contact and move the valve stem and plug into the shutoff position. In the operating position, the lever arm is held stationary by a trip arm and in the shutoff position the lever arm is tripped and the valve plug seals the aperture. A compression spring located and compressed between the top of the valve stem and the lever arm to urge the valve stem and the plug upwardly so the second side of the plug maintains a seal between the passageway and the cavity. The method is comprised of the step of moving the valve stem downwardly until the valve plug separates from the passageway to exercise the valve, while at the same time retaining the plug sufficiently away from the aperture to maintain the valve in the operating position and limiting the upward vertical travel of the lever arm to a range that will not trip the valve when the valve is exercised.

BRIEF DESCRIPTION OF THE DRAWINGS

In the drawings, wherein like references are used throughout to describe like parts;

FIG. 7 is a perspective view of the valve stem and attachments including how the turning block operates; and FIG. 8 is an end view, along line "8-8" in FIG. 1, of the lever arm stabilizer associated with the subject invention but with a cross-sectional view of the top of the stabilizer arm.

DESCRIPTION OF THE INVENTION

Figure 1:
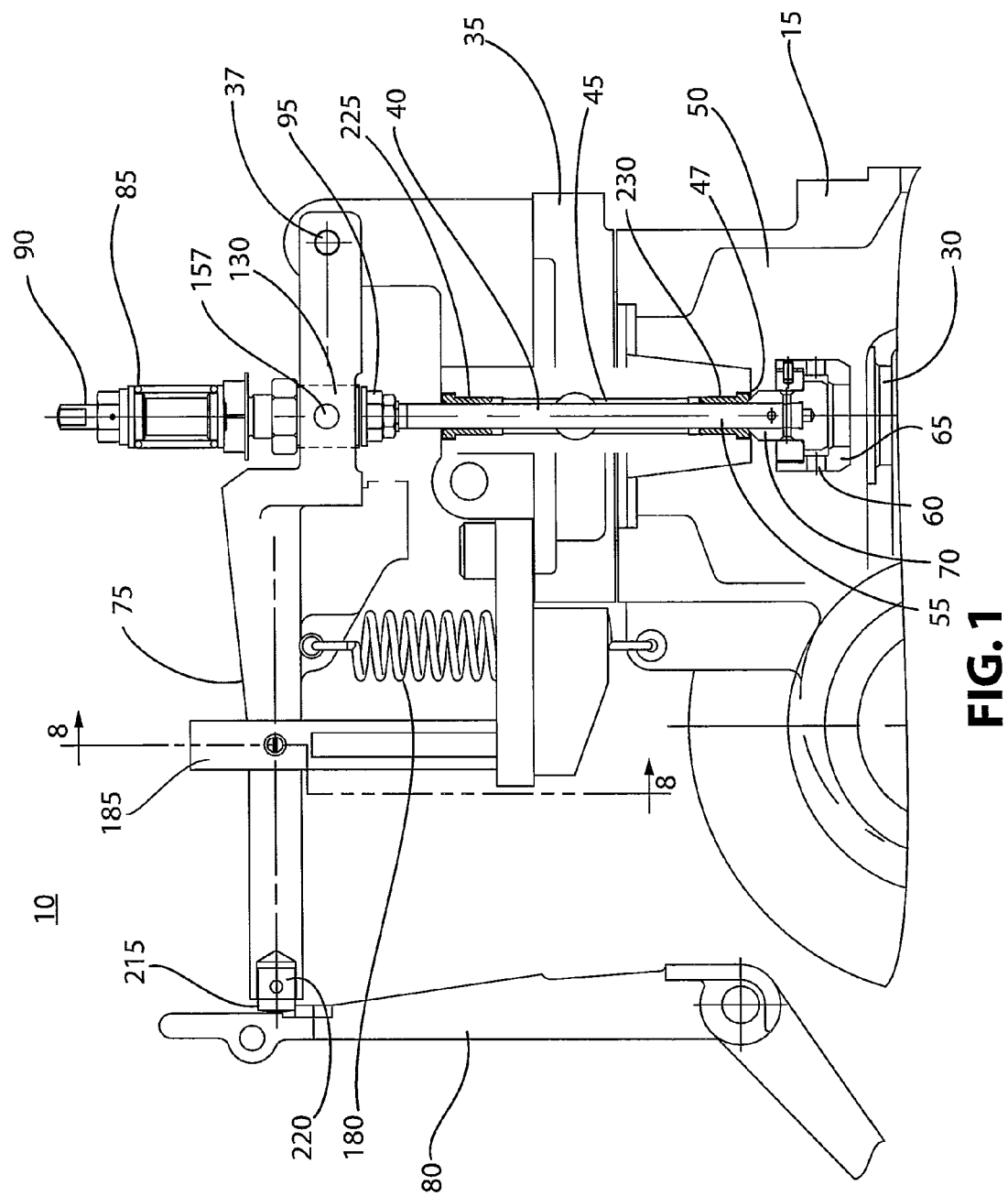
FIG. 1 is a side view of a valve exerciser associated with an emergency shutoff valve in accordance with the subject invention.
Figure 2:
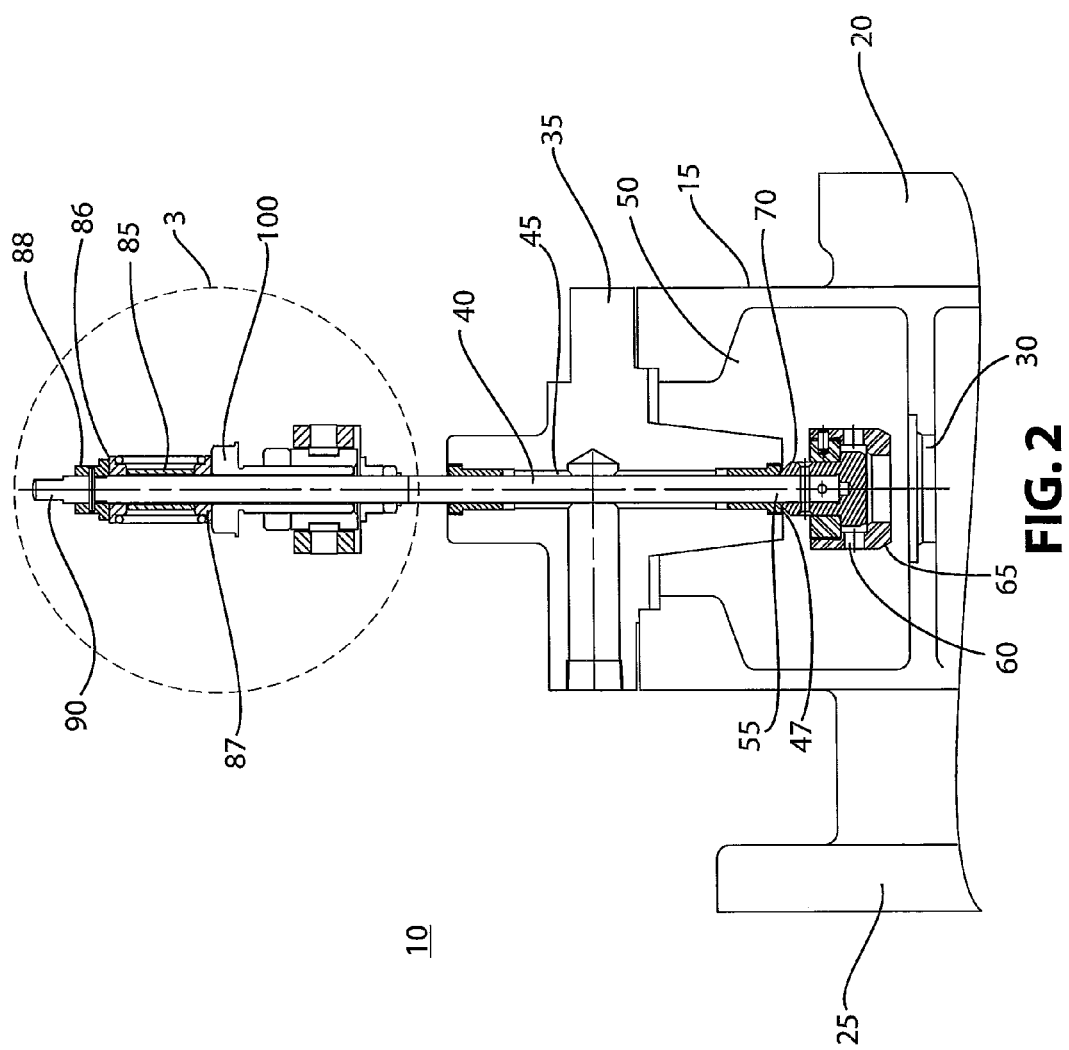
FIG. 2 is a side view of the valve exerciser with the valve stem and parts attached thereto rotated 90 degrees with select cross-sectional views shown therein.

FIGS. 1 and 2 illustrate an emergency shutoff valve 10 used with a steam turbine. The valve includes a steam chest body, hereinafter valve body 15 having an inlet 20 and an outlet 25 with an aperture 30 therebetween. A steam chest cover 35 is connected to the valve body 15 for supporting components of the valve exerciser to be described.

A valve stem 40 extends through a passageway 45 within the cover 35 and through the passageway opening 47 into a cavity 50 of the valve body 15 for enabling vertical reciprocal movement of the valve stem 40.

The bottom 55 of the valve stem 40 has a valve plug 60 with the first side 65 adapted to seal the aperture 30 for emergency shutoff in a shutoff position (not shown) and a second side 70 adapted to rest against the cover 35 to provide a seal between the passageway 45 and the valve cavity 50 in an operating position shown in FIG. 1.

Directing attention to FIG. 1, a lever arm 75 is pivotally attached to the cover 35 at cover pivot 37 and biased to contact and move the valve stem 40 and plug 60 into the shutoff position, wherein the plug 60 occupies the aperture 30 to prevent flow between the inlet 20 and the outlet 25. In the operating position, the lever arm 75 is held stationary by a trip arm 80 and, in the shutoff position, the lever arm 75 is released by the trip arm 80 with the second side 70 of the plug 60 sealing the passageway 45 and the valve plug 60 is driven downwardly to seal the aperture 30.

Figure 3:
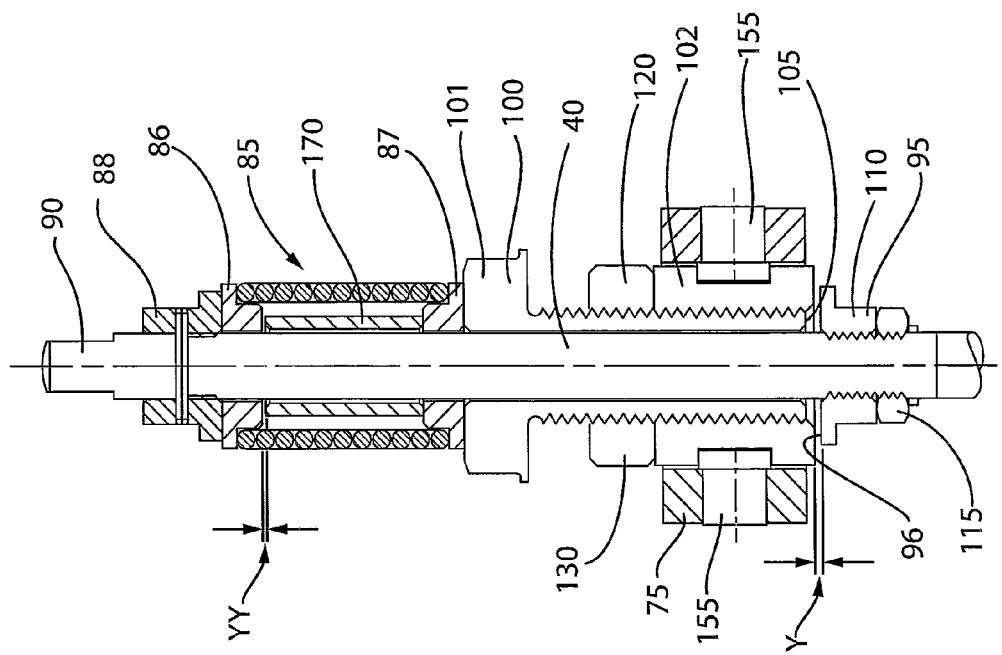
FIG. 3 is an enlarged cross-sectional view of the encircled area identified as 3 in FIG. 2 with the valve in the normal operating position.

Directing attention to FIG. 2 and to FIG. 3, which is an enlargement of the encircled area identified by "3" in FIG. 2, a compression spring 85 is located and compressed between the top 90 of the valve stem 40 and the lever arm 75 to urge the valve stem 40 and the plug 60 upwardly to maintain a seal between the passageway 45 and the cavity 50. The compression spring 85 is compressed by a top spring seat 86 and a bottom spring seat 87 and, in particular, are compressed between a top ring 88 on the valve stem 40, which top ring 88 may be a nut threaded to the valve stem, and the head 101 of a stroker bolt 100 threadingly engaged with the lever arm 75 (FIG. 1). As a result, with the lever arm 75 as an anchor, the pre-loaded compression spring 85 provides a constant upward force on the valve stem 40 such that the plug 60 is urged against the opening 47 of the passageway 45. Additionally, the steam pressure in the valve body 15 also applies a force upon the valve stem 40 to urge the valve plug 60 against the opening 47 of the passageway 45. Therefore, even when the valve stem 40 thermally expands, the plug 60 is restrained against and seals the passageway opening 47 during normal operation.

As an overview, the valve stem 40 is exercised by a stroker bolt 100 that acts to positively displace in a downward direction the valve stem 40 relative to the lever arm 75. When the stroker bolt 100 is advanced downwardly, the valve stem 40 is pushed by the stroker bolt 100. When the stroker bolt 100 is retracted upwardly, the pressure differential between the steam pressure in the cavity 50 and the ambient pressure acts to force the valve stem 40 upwardly, where it can only go as far as abutting against the bushing at the opening 47 of the passageway 45.

Providing additional detail and directing attention to FIG. 3, the stroker bolt 100 is threadingly engaged with the turning block 102 that is engaged with the lever arm 75 using two pins 155. A bottom ring 95, which may be a bottom nut 110 threaded to the valve stem 40, is engaged with the valve stem 40 below the lever arm 75. The stroker bolt 100 may be rotated such that the bottom 105 of the stroker bolt 100 is advanced to engage, as shown in FIG. 4, the bottom ring 95 and move the valve stem 40 downwardly to exercise the valve without tripping the valve.

Figure 5:
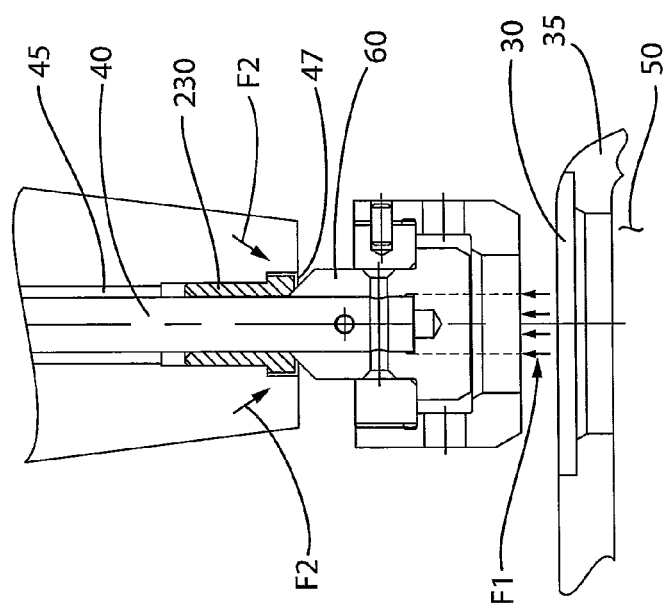

FIGS. 3 and 5 show the valve stem 40 and plug 60 in the normal operating position with the second side 70 of the plug 60 sealing the opening 47 of the passageway 45. The bottom bushing 230 in the passageway 45 surrounds the valve stem 40 at the opening 47. This is one area in which build-up occurs and inhibits the valve stem 40 movement. Note there is a gap between the bottom 105 of the stroker bolt 100 and the top of the bottom ring 95 to ensure thermal growth does not create unwanted contact between the stroker bolt 100 and the bottom ring 95.

Figure 4:
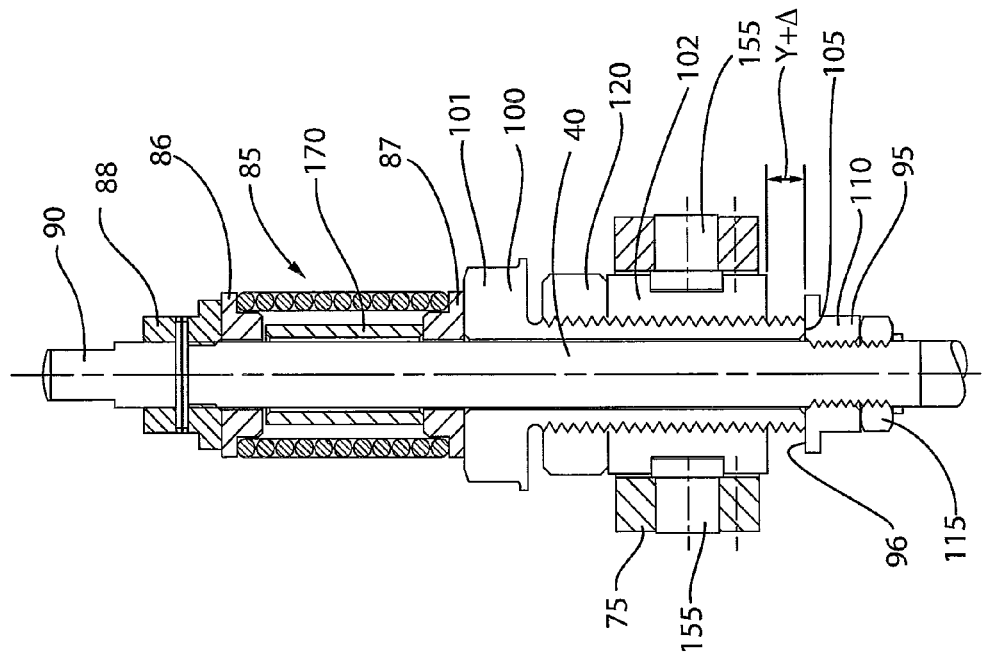
FIG. 4 is an enlarged cross-section similar to FIG. 3, however, with the valve stem and disk displaced while being exercised.
Figure 6:
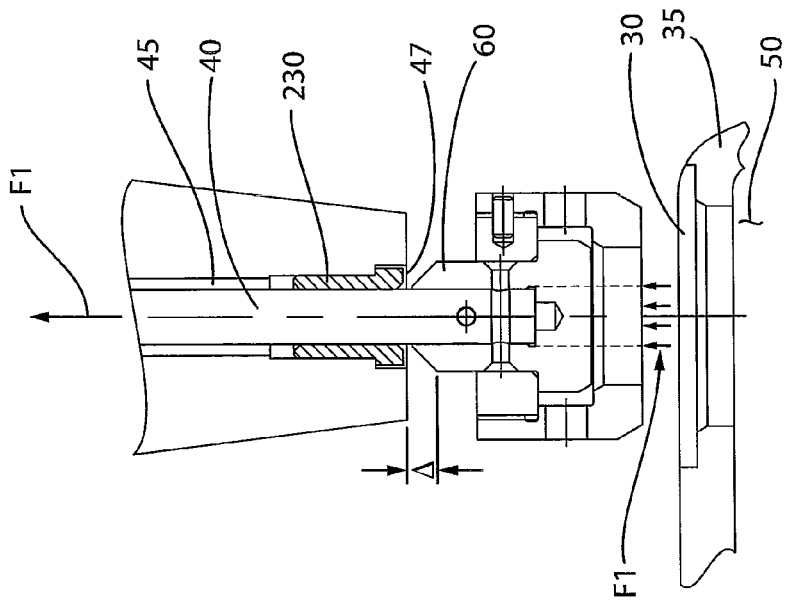
FIGS. 5 and 6 are illustrations of the positioning of the valve disk in normal operation and while being exercised, respectively, and these positions correspond to those shown in FIGS. 3 and 4, respectively.

FIGS. 4 and 6 show the valve stem 40 and plug 60 extended to its range in the exercised position with the bottom 105 of the stroker bolt 100 pushing down on the top 96 of the bottom ring 95, thereby separating the plug 60 from the opening 47 of the passageway a distance Δ.

Directing attention to FIG. 3, the bottom ring 95 may be comprised of a bottom nut 110, wherein the bottom nut 110 and an opposing jam nut 115 are threadingly engaged with the valve stem 40 and tightened and locked against each other to secure the bottom nut 110 onto the valve stem 40.

The stroker bolt 100 is utilized only when it is desired to exercise the valve and, therefore, most of the time, the stroker bolt 100 is inactive such that the bottom 105 is distanced an amount Y from the bottom ring 95, as illustrated in FIG. 3.

To ensure the stroker bolt 100 does not become loose and inadvertently contact the bottom ring 95, a stroker jam ring 120, which may be a nut 130, engages the valve stem 40 and is positioned between the stroker bolt head 101 and the turning block 102 of the lever arm 75, such that in the operating position, the stroker jam ring 120 is urged against the turning block 102 and prevents rotation of the stroker bolt 100. The stroker jam ring 120 may be a jam nut 130 threadingly engaged with the valve stem 40 and tightened against the turning block 102 of the lever arm 75 to secure the stroker bolt 100 in place.

As illustrated in FIGS. 1 and 7, the turning block 102 is essentially a sleeve that surrounds the valve stem 40 and is attached directly to the lever arm 75 at the lever arm pivot 157 using two pins 155. Therefore the turning block 102 floats about the valve stem 40 and if externally unrestrained, could slide up and down and rotate freely about the valve stem 40. However, the turning block 102 is externally connected to the lever arm bore 157 and threadingly connected to the stroker bolt 100.

During normal operation, the valve stem 40 is urged upwardly relative to the turning block 102 and the lever arm 75 by the compression spring 85. However, during emergency shut-down, the lever arm 75 and the turning block 102 move downwardly against the bottom ring 95, which is attached to the valve stem 40, to move the valve stem 40 downward to close the valve.

Directing attention to FIG. 7, the turning block 102 has a guide 140 for lateral motion and further includes a connector 145 comprised of a rectangular platform 150 that slides within the lateral guide 140 and furthermore has a pin 155 extending therefrom. As illustrated in FIG. 1, the pin 155 is mounted within a bore 157 of the lever arm 75. As the lever arm 75 pivots about the cover pivot 37, the arcuate motion at the bore 157 may be accommodated by the lateral motion of the rectangular platform 150 in the guide 140 and the rotational motion of the pin 155 within the bore 157.

In the operating position (FIG. 3) there is a gap Y between the bottom ring 95 and the turning block 102 of the lever arm 75 to accommodate for thermal growth of the valve stem 40 to avoid engaging the lever arm 75.

The lever arm 75 (FIG. 1) is biased to the closed position by a valve trip spring 180 connected between the lever arm 75 and the valve body 15 urging the lever arm 75 to the shutoff position.

It should be appreciated that in the operating condition the valve cavity 50 (FIG. 1) is pressurized by steam traveling therethrough. Typical pressures may be 500 psig and during normal operation the plug 60 seals the passageway 45 such that even though the steam pressure acts upon the valve stem 40, any force F1 generated by that pressure is transferred through the plug 60 directly to the cover 35 surrounding opening 47 of the passageway 45 as illustrated by forces F2. However, when the valve is exercised during normal operation, the force F1 generated by the steam pressure upon the valve stem 40 is no longer transferred directly to the cover 35 but the same force F1 is transferred along the length of the valve stem 40 to the stroker bolt 100 then to the turning lock 102 and into the lever arm 75. This upward force is sufficient to overcome the force of the valve trip spring 180 and to lift the lever arm 75. Absent some sort of constraint, the lever arm 75 would continue to lift such that the trip arm 80 would release the valve arm 75 causing the valve to trip.

To prevent this, the valve exerciser further includes a lever arm stabilizer 185 (FIGS. 1 and 8) extending from the cover 35 along a plane defined by the arc travelled by the lever arm 75. The stabilizer arm 185 restrains the lateral motion and upward vertical motion of the lever arm 75 and allows the lever arm 75 to travel downwardly. The stabilizer 185 includes an adjustable vertical set screw 190 positioned above the lever arm 75 to define the upper limit of travel of the lever arm 75. By doing so, even when the valve is exercised, as shown in FIGS. 4 and 6, and the steam pressure from the cavity 50 forces the valve stem 40 and the lever arm 75 upwardly, the upward travel of the level arm 75 is limited by the set screw 190, thereby avoiding tripping the valve.

Additionally, it is possible to inadvertently cause a valve trip when the stroker bolt 100 is rotated to exercise the valve. Depending upon the friction between the threads of the stroker bolt 100 and the turning block 102, torque will be transmitted to the lever arm 75 in an amount sufficient to displace the lever arm 75 in the lateral direction and, once again, trip the valve. To prevent this, a pair of adjustable set screws 195, 200 extend laterally from each side 205, 210 of a U-shaped enclosure 212 to limit the lateral displacement of the lever arm 75 that may be imparted when the stroker bolt 100 is rotated to exercise the valve, thereby avoiding tripping the valve. The set screws 195, 200 may be adjusted to limit the lateral motion of the lever arm 75 but must also provide sufficient clearance for the lever arm 75 to freely move in the vertical direction to close the valve, when necessary.

As illustrated in FIG. 1, the trip arm 80 maintains the lever arm 75 in the operating position through a knife-edge 215 that is engaged within a slot 220 of the lever arm 75. The knife edge 215/slot 220 engagement provides hair-trigger sensitivity such that upon occurrence of an abnormal event, the trip arm is released from the lower arm 75, thereby initiating a valve shut down.

In the event the valve is tripped and must be reset, the lever arm 75 must be raised to a level above the knife-edge 215 of the trip arm 80. The vertical set screw 190, which was positioned to restrict upward vertical movement of the lever arm 75, must be retracted to permit this additional vertical displacement.

Now, when the lever arm 75 is lifted, the turning block 102 secured to the lever arm 75 is also lifted. This, in turn, lifts the stroker bolt 100 which acts against the compression spring 85. To avoid compressing the compression spring 85 beyond the elastic limit, a spacer 170 (FIG. 3) is positioned within the compression spring 85 which permits compression in the amount of YY, before the spacer bottoms to and protect the spring 85.

The valve stem 40 may be supported within the passageway 45 by a top bushing 225 and the bottom bushing 230 in the cover 35. It is typically at these locations that buildup occurs which may inhibit the travel of the valve stem 40 during an emergency shutdown.

What has so far been described are details of the valve exerciser, the invention is also directed to a method of using the valve exerciser. In particular, the method of exercising a valve stem 40 involves moving the valve stem 40 downward until the valve plug 60 separates from the opening 47 of the passageway 45 to exercise the valve 10 while at the same time retaining the plug 60 sufficiently away from the aperture 30 to maintain the valve 10 in the operating position and limiting the upward vertical travel of the lever arm 75 to a range that will not trip the valve 10 when the valve stem 40 is exercised. The step of moving the valve stem 40 downward is comprised of rotating the stroker bolt 100 threadingly engaged with the lever arm 75 to urge the valve stem 40 downward.

The step of moving the valve stem 40 downward may be further comprised of engaging a bottom ring 95 onto the valve stem 40 below the lever arm 75 and urging the bottom ring 95 downward with the stroker bolt 100 to urge the valve stem 40 downward. Additionally, the lateral travel of the lever arm 75 may be limited at a location away from the valve stem 40 to a range that will not trip the valve 10.

After the valve stem 40 has been moved downward, the valve stem may then be moved upward such that the valve stem 40 reciprocates in the passageway 45. This single cycle may be sufficient or it may be repeated to break up any build-up on the bushings. Finally, the valve stem 40 may be moved upward until the plug 60 once again seals the opening 47 of the passageway 45 and the exercising has been complete.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. A valve exerciser for a valve stem of an emergency shutoff valve of a steam turbine, wherein the shutoff valve is adapted to be exercised while the turbine is operating, and wherein the shutoff valve has a shutoff valve body with a steam inlet, a steam outlet, and an aperture therebetween and comprises:

a cover connected to the shutoff valve body for supporting components of the exerciser;

a valve stem extending through a passageway within the cover into a cavity of the shutoff valve body for enabling vertical reciprocal movement of the valve stem, wherein a bottom of the valve stem has a double sided plug with a first side adapted to seal the aperture for emergency shutoff in a shutoff position and a second side adapted to rest against the cover to provide a seal between the passageway and the cavity in a normal operating position, a lever arm pivotally attached to the cover and biased to contact the valve stem and move the valve stem and the double sided plug into the shutoff position, and wherein, in the normal operating position, the lever arm is held stationary by a trip arm and in the shutoff position, the lever arm is tripped and the double sided plug seals the aperture;

a bottom ring engaged with the valve stem below the lever arm against which the lever arm moves to close the valve;

a compression spring located and compressed between a top of the valve stem and the lever arm to urge the valve stem and the double sided plug upwardly so the second side of the double sided plug maintains a seal between the passageway and the cavity;

a stroker bolt threadingly engaged with the lever arm, wherein the stroker bolt is threaded to be rotated and advanced to engage the bottom ring and move the valve stem downwardly to exercise the shutoff valve without tripping the shutoff valve.

2. The valve exerciser according to claim 1, wherein the bottom ring is a bottom nut and wherein the bottom nut and an opposing jam nut are threadingly engaged with the valve stem and tightened and locked against each other.

3. The valve exerciser according to claim 1, further including a stroker jam ring engaging with the valve stem and positioned between the stroker bolt and the lever arm, wherein in the operating position, the stroker jam ring is urged against and prevents rotation of the stroker bolt.

4. The valve exerciser according to claim 3, wherein the stroker jam ring is a jam nut threadingly engaged with the valve stem that is tightened against the lever arm to secure the stroker bolt in place.

5. The valve exerciser according to claim 1, further including a turning block secured about the valve stem between the lever arm and a top ring on the valve stem, wherein the turning block has a lateral guide for lateral motion and further including a connector comprised of a rectangular platform matable with the lateral guide and a pin extending therefrom, wherein the lever arm is pivotally secured to the pin such that an arcuate motion of the lever arm may be accommodated by the arrangement between the lever arm, connector, and valve stem.

6. The valve exerciser according to claim 1, wherein the compression spring is encased by two opposing spring seats captured between a head of the stroker and a top nut on the valve stem.

7. The valve exerciser according to claim 1, further including a spacer within the compression spring to prevent spring deformation beyond the elastic deformation range of the spring.

8. The valve exerciser according to claim 1, wherein in the operating position, there is a gap between the bottom ring and the lever arm to accommodate for thermal growth of the valve stem without engaging the lever arm.

9. The valve exerciser according to claim 1, wherein the lever arm is biased by a trip valve spring connected between the lever arm and the cover urging the lever arm to the shutoff position.

10. The valve exerciser according to claim 1, further including a lever arm stabilizer extending from the cover along a same plane defined by the pivoting of the lever arm, wherein the lever arm stabilizer restrains the lever arm motion and allows the lever arm to travel up and down without lateral motion.

11. The valve exerciser according to claim 10, wherein an adjustable vertical set screw extends from the lever arm stabilizer above the lever arm and defines the upper limit of travel of the lever arm.

12. The valve exerciser according to claim 11, wherein the lever arm stabilizer is U-shaped and adjustable set screws extend laterally from each side of the lever arm stabilizer to limit the lateral displacement of the lever arm that is imparted when the stroker bolt is rotated to exercise the valve.

13. The valve exerciser according to claim 12, wherein in the event the shutoff valve is tripped and must be reset, the vertical set screw is raised to permit the lever arm to travel beyond its operating range to allow a knife edge of the trip arm to be reset within the lever arm.

14. The valve exerciser according to claim 1, further including bushings laterally supporting the valve stem at a top and a bottom of the passageway.

15. A valve exerciser for a valve stem of an emergency shutoff valve of a steam turbine, wherein the valve is adapted to be exercised while the turbine is operating, and wherein the valve has a steam inlet, a steam outlet, and an aperture therebetween and comprises:

a frame connected to a shutoff valve body for supporting components of the valve exerciser;

a valve stem extending through a passageway within the frame into a cavity of the shutoff valve body for enabling vertical reciprocal movement of the valve stem, wherein a bottom of the valve stem has a double sided plug with a first side adapted to seal the aperture for emergency shutoff in a shutoff position and a second side adapted to rest against the frame to provide a seal between the passageway and the valve cavity in a normal operating position, a lever arm pivotally attached to the frame and biased to contact and move the valve stem and the double sided plug into the shutoff position, and wherein, in the normal operating position, the lever arm is held stationary by a trip arm and in a shutoff position, the lever arm is tripped and the double sided plug seals the aperture;

a bottom nut threadingly engaged with the valve stem below the lever arm against which the lever arm moves to close the valve;

a compression spring located and compressed between the top of the valve stem and the lever arm to urge the valve stem and the double sided plug upwardly so the second side of the double sided plug maintains a seal between the passageway and the cavity;

a stroker bolt threadingly engaged with the lever arm, wherein the stroker bolt is threaded to be rotated and advanced to engage the bottom nut and move the valve stem downwardly to exercise the valve without tripping the valve;

a turning block secured about the valve stem between the lever arm and a top nut on the valve stem, wherein the turning block has a lateral guide for lateral motion and further includes a connector comprised of a rectangular platform matable with the lateral guide and a pin extending therefrom, wherein the lever arm is pivotally secured to the pin such that an arcuate motion of the lever arm is accommodated by the arrangement between the lever arm, connector, and valve stem; and a lever arm stabilizer extending from the frame along a same plane defined by the pivoting of the lever arm, wherein the lever arm stabilizer restrains the lever arm motion and allows the lever arm to travel up and down without lateral motion.

16. A method of exercising a valve stem of an emergency shutoff valve of a steam turbine while the turbine is operating, and
   a) wherein the shutoff valve has a shutoff valve body with a steam inlet, a steam outlet, and an aperture therebetween;
   b) wherein the shutoff valve body has a cover connected thereto for supporting components used for exercising a valve stem;
   c) wherein a valve stem extends through a passageway within the cover into a cavity of the shutoff valve body for vertical reciprocal movement of the valve stem;
   d) wherein a bottom of the valve stem has a valve plug with a first side adapted to seal the aperture for emergency shutoff in a shutoff position and a second side adapted to rest against the cover to provide a seal between the passageway and the valve cavity in an operating position;
   e) a lever arm pivotally attached to the cover and biased to contact and move the valve stem and the valve plug into the shutoff position, and wherein, in the operating position, the lever arm is held stationary by a trip arm and in the shutoff position, the lever arm is tripped and the valve plug seals the aperture; and
   f) a compression spring located and compressed between a top of the valve stem and the lever arm to urge the valve stem and the valve plug upwardly so the second side of the valve plug maintains a seal between the passageway and the cavity; and wherein the method is comprised of the steps of:
   1) moving the valve stem downward until the valve plug separates from the passageway to exercise the shutoff valve while at the same time retaining the valve plug sufficiently away from the aperture to maintain the shutoff valve in the operating position and
   2) limiting an upward vertical travel of the lever arm to a range that will not trip the shutoff valve when the shutoff valve is exercised.

17. The method of exercising a valve stem of an emergency shutoff valve of a steam turbine according to claim 16, further including the step after moving the valve stem downward, of moving the valve stem upward until the valve plug maintains a seal between the passageway and the cavity.

18. A method of exercising a valve stern of an emergency shutoff valve of a steam turbine according to claim 16, wherein the step of moving the valve stem downward is comprised of rotating a stroker threadingly engaged with the lever arm to urge the valve stem downward.

19. A method of exercising a valve stem of an emergency shutoff valve of a steam turbine according to claim 18, wherein the step of moving the valve stem downward is further comprised of engaging a bottom ring onto the valve stem below the lever arm and urging the bottom ring downward with the stroker to urge the valve stem downward.

20. A method of exercising a valve stem of an emergency shutoff valve of a steam turbine according to claim 18, further including the step of limiting lateral travel of the lever arm at a location away from the valve stem to a range that will not trip the shutoff valve.

* * * * *

UNITED STATES PATENT AND TRADEMARK OFFICE
CERTIFICATE OF CORRECTION

PATENT NO. : 9,057,450 B2  
APPLICATION NO. : 13/799896  
DATED : June 16, 2015  
INVENTOR(S) : Shurina et al.

Page 1 of 1

It is certified that error appears in the above-identified patent and that said Letters Patent is hereby corrected as shown below:

In the claims

Column 10, Line 15, Claim 18, delete "stern" and insert -- stem --

Signed and Sealed this
Twenty-second Day of March, 2016

Michelle K. Lee
*Director of the United States Patent and Trademark Office*